United States Patent [19]

Longmore

[11] Patent Number: 4,816,763
[45] Date of Patent: Mar. 28, 1989

[54] FLUID FLOW MONITORING

[76] Inventor: Donald B. Longmore, 97 Chertsey Lane, Staines Middlesex, England

[21] Appl. No.: 124,107

[22] PCT Filed: Jan. 13, 1987

[86] PCT No.: PCT/GB87/00013
§ 371 Date: Sep. 23, 1987
§ 102(e) Date: Sep. 23, 1987

[87] PCT Pub. No.: WO87/04243
PCT Pub. Date: Jul. 16, 1987

[30] Foreign Application Priority Data

Jan. 13, 1986 [GB] United Kingdom ............... 8600664

[51] Int. Cl.⁴ ............................................. G01R 33/20
[52] U.S. Cl. ................................. 324/306; 324/307; 324/309
[58] Field of Search ............... 324/300, 307, 309, 303, 324/306, 318, 322

[56] References Cited

U.S. PATENT DOCUMENTS 4,424,487 1/1984 Lauffer .............................. 324/307

Primary Examiner—Michael J. Tokar
Attorney, Agent, or Firm—Watson, Cole, Grindle & Watson

[57] ABSTRACT

The flow pattern of a gas or a liquid around a shaped object which is non-magnetic and is either NMR opaque or NMR translucent is observed by placing the shaped object in a duct in the working volume of an NMR imaging system and streaming a gas or a liquid which is NMR opaque or NMR translucent through the duct so that it deflects around the shaped object to create a flow pattern, and effecting NMR image reconstruction of the flow pattern for observation thereof.

7 Claims, 1 Drawing Sheet

FLUID FLOW MONITORING

FIELD OF THE INVENTION

This invention relates to methods and apparatus for monitoring the flow of fluids over shapes to determine the aerodynamic or hydrodynamic characteristics of the shapes, to reproduce the conventional function of wind tunnels.

SUMMARY OF THE INVENTION

The method of the present invention is characterized in that the shapes, which are mounted in a duct, are subjected to the flow of a fluid which comprises Nuclear Magnetic Resonance (N.M.R.) opaque or translucent material whose flow pattern is observed by NMR image reconstruction, the shapes being of non-magnetic material which is also NMR opaque or translucent.

The shapes may be solid or hollow, representing ducts, trunking, vehicle bodies, aircraft or any other items conventionally tested in wind tunnels.

If liquid flows are to be examined, water is passed through the duct, over and/or through the shape and conventional phase mapping techniques may be employed for image reconstruction.

For gas flows, the fluid may comprise atomised water, steam or hydrated microspheres of hydron in air.

Standard NMR phase mapping or echo rephasing techniques may be employed to monitor steady flow characteristics, and for unstable flow conditions, various forms of rapid imaging techniques may be employed.

The invention also includes apparatus suitable for performing the above method, the apparatus being characterized in that the duct is defined within the working volume of an NMR imaging system and that apparatus for NMR image reconstruction is provided to permit observation of the flow pattern of fluid past the shapes.

DETAILED DESCRIPTION OF THE PREFERRED EMBODIMENTS

Figure 1:
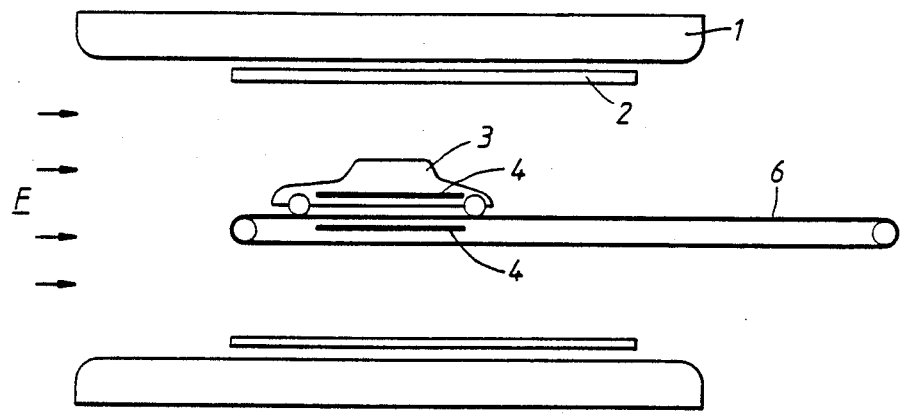
FIG. 1 is a schematic axial section through a preferred embodiment of an apparatus according to the present invention, the receiver coil thereof being partially embedded within the shaped object that is positioned in the duct therein.

As seen in FIG. 1, a stream F of NMR opaque or translucent fluid is passed through the duct formed within the magnetic coil 1 and R.F. transmitting and gradient coils 2. In FIG. 1, the shaped object 3 to be tested is shown as a model of a motor car. Close coupled receiver coils 4 are located where they will not interfere with the fluid flow, being partly embedded in shaped object 3 and within the loop of a plastic belt 6 that forms a "rolling" road.

Figure 2:
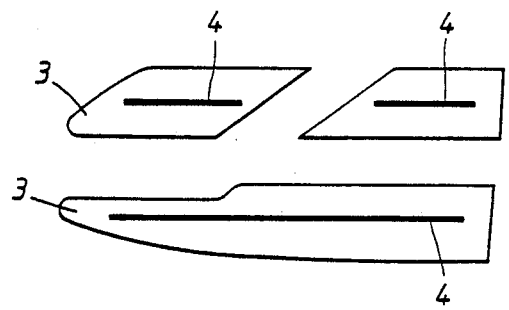
FIG. 2 is a schematic side view of a sectional shaped object which defines a flow duct between its sections and wherein the receiver coils of the inventive apparatus are embedded in the various sections.

FIG. 2 merely shows a sectional shaped object representing a flow duct, with the receiver coils 4 embedded in the sections of the shaped object.

I claim:

1. A method of observing the flow pattern of a fluid streaming around and past a shaped object which is made of non-magnetic material and is either NMR opaque or NMR translucent, said method comprising the steps of providing a duct through which a fluid can flow, creating a working volume of an NMR imaging system within the duct, causing fluid which is NMR opaque or NMR translucent to stream through said duct, positioning said shaped object in said duct so as to be located within said working volume and in the path of the streaming fluid and thereby deflect the stream of fluid as it flows around said shaped object and create a flow pattern, effecting NMR image reconstruction of said flow pattern, and observing said flow pattern.

2. A method according to claim 1, wherein said fluid is a gas.

3. A method according to claim 2, wherein said gas is stream.

4. A method according to claim 1, wherein said fluid is a liquid.

5. A method according to claim 4, wherein said liquid is water.

6. A method according to claim 1, wherein said fluid comprises hydrated microspheres of hydron in air.

7. An apparatus for observing the flow pattern of a fluid as it flows around and past an object, the object being non-magnetic and either NMR opaque or NMR translucent and the fluid being either NMR opaque or NMR translucent, said apparatus comprising an NMR magnetic coil means for providing a duct and a working volume of an NMR imaging system therein through which fluid can flow, and receiver coil means located in said duct, said receiver coil means providing data enabling NMR image reconstruction of the flow pattern of an NMR opaque or NMR translucent fluid passing aroung a shaped object positioned in said duct.

* * * * *